3,022,297
Patented Feb. 20, 1962

3,022,297
16-FLUORINATED CORTICOSTEROIDS

Rudolph G. Berg, New London, and Gerald D. Laubach, Niantic, Conn., assignors to Chas. Pfizer & Co., Inc., Brooklyn, N.Y., a corporation of Delaware
No Drawing. Filed Nov. 2, 1959, Ser. No. 850,032
4 Claims. (Cl. 260—239.55)

The present invention relates to steroid compounds and is more particularly concerned with a process for the production of novel 16-fluorinated compounds.

This application is a continuation-in-part of our earlier filed copending United States patent application Serial Number 801,003; filed March 23, 1959.

It is well known that the introduction of fluorine into various positions of the steroid nucleus markedly enhances therapeutic activity. The C–6 and C–9 positions have received a great amount of attention and satisfactory methods for the preparation of 6- and 9-fluoro steroids are known. The C–16 position, on the other hand, has received little attention undoubtedly due to the difficulty of introducing a fluoro atom into this position. Prior to this invention, 16-fluorinated steroids and methods for the preparation thereof via (1) the reaction of the appropriate 16α,17α-oxido steroid with hydrogen fluoride or (2) the reaction of a suitable 16-bromo-21-acyloxy steroid with a metal fluoride, have been reported. However, these methods produce unsatisfactory yields of a generally ill-defined product.

It has now been found that a fluoro atom can be easily and economically introduced into the 16β-position of the steroid molecule to give 16β-fluorinated steroids which possess the complete corticosteroid side chain. The essential feature of the process of this invention resides in protecting the corticosteroid side chain of, for example, a 16β-bromo corticosteroid by conversion to the 17,20;20,21-bismethylenedioxy derivative. The thus protected compound is then reacted with silver fluoride to give the corresponding 16β-fluorinated corticosteroid-17,20;20,21-bismethylenedioxy derivative from which the bismethylenedioxy function can easily be removed.

The novel process of the present invention is illustrated by the following reaction sequence:

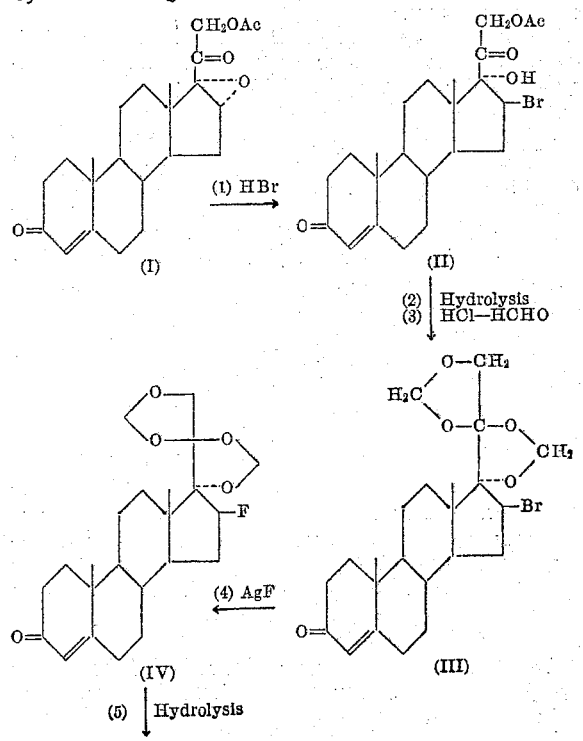

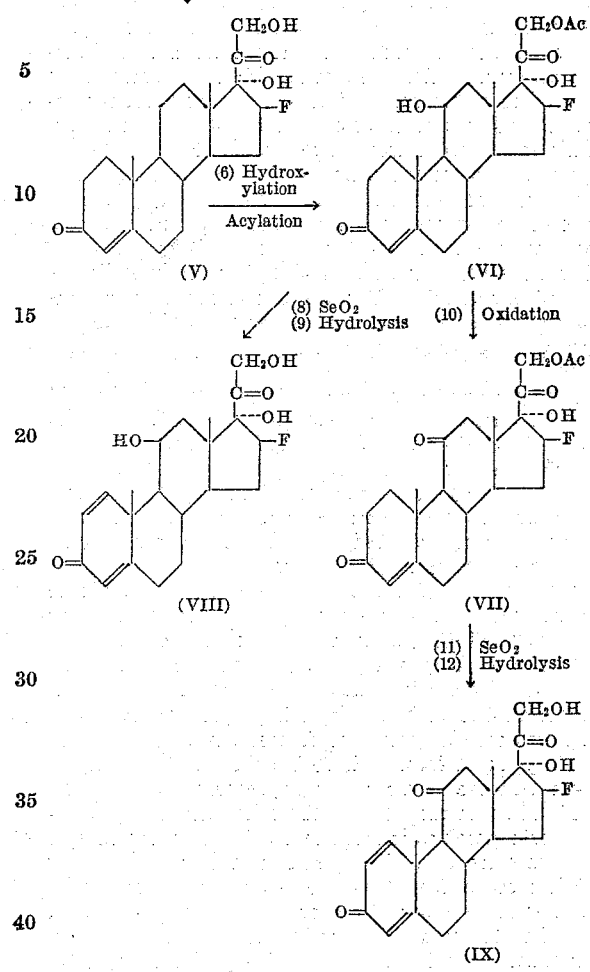

The process of the present invention may be practiced in general by reaction of the appropriate 17,20;20,21-bismethylenedioxy-16β-bromo corticosteroid with silver fluoride to produce the corresponding 17,20;20,21-bismethylenedioxy-16β-fluoro corticosteroid. Reversal of the protective bismethylenedioxy function in acid media yields the 16β-fluoro corticosteroid. It must be pointed out that although the reaction sequence illustrated utilizes 17,20; 20,21-bismethylenedioxy-16β-bromo desoxycorticosterone as reactant, a great variety of 16β-bromo-corticosteroids may serve as starting materials for this conversion. The presence of unsaturation, and/or of nuclear substituents other, of course, than chloro, bromo and iodo does not interfere with this reaction.

The 17,20;20,21-bismethylenedioxy-16β-bromo corticosteriod reactants are prepared by well known methods (Beyler et al., U.S. 2,888,456 and 2,888,457). A convenient route to 16β-bromodesoxycorticosterone and thence to the corresponding 17,20;20,21-bismethylenedioxy derivative is illustrated above. Removal of the protective bismethylenedioxy function via acid hydrolysis produces the 16β-fluoro corticosteroid possessing the complete corticosteroid side chain. The valuable products thus obtained serve as intermediates for the production of other corticosteroids as is described in our copending and concurrently filed patent applications Serial Nos. 850,031; 850,038; 850,039 and 850,108 and as illustrated herein.

In carrying out the process of the present invention, as illustrated by the above reaction sequence, 16α,17α-oxido-desoxycorticosterone acetate is dissolved in a suitable organic solvent, preferably acetic acid, and treated with an halogenating agent other, of course, than a fluorinating agent; such as hydrogen bromide, or hydrogen chloride, or a metal bromide or chloride which releases hydrogen halide when treated with acids. Hydrogen bromide is the preferred halogenating agent because it affords a faster and smoother reaction and generally produces a higher yield of the desired halohydrin. In the preferred embodiment of this invention, the starting $16\alpha,17\alpha$-epoxide (I) is dissolved in acetic acid and treated at about room temperature with a solution of about 30 to 40 percent hydrobromic acid in acetic acid. The reaction time is generally between 5 minutes and 4 hours, after which the reaction product is recovered in a conventional manner, such as, for example, by adding water to the reaction mixture to precipitate the halohydrin derivative.

The 21 acetoxy-halohydrin (II) thus produced is hydrolyzed under mild acid conditions at about room temperature. The reaction time is generally from a few hours to up to 3 days depending upon the particular compound.

In the preferred embodiment of this invention, the said 21-acetoxy-halohydrin is dissolved in chloroform and methanol and hydrolyzed with hydrochloric acid of 20 to 37% concentration. The resulting 21-hydroxy halohydrin is isolated from the hydrolysis mixture by evaporation under reduced pressure with simultaneous addition of water and purified, if desirable, by recrystallization from a suitable organic solvent.

The thus-produced $16\beta$-bromo-11-desoxyhydrocortisone is combined with formaldehyde-hydrogen chloride or formaldehyde-hydrogen bromide at room temperature to produce the corresponding 17,29;20,21-bismethylenedioxy derivative of the side chain. The reaction time is generally from 4 to 72 hours depending upon the compound being treated. Polymers of formaldehyde can also be used in place of formaldehyde but the formaldehyde-hydrogen chloride is the preferred reagent. In the preferred embodiment of this invention the 21-hydroxy-halohydrin dissolved in methylene chloride is treated with equal volumes of 37% aqueous formaldehyde and of 37% hydrochloric acid and the two phase system rapidly stirred at room temperature for several hours, generally, from 10 to 48 hours. The methylene chloride which may be gradually distilled off during this period may be replaced by about 4 to 6 volumes of hexane. The 17,20;20,21-bismethylenedioxy derivative of the $16\beta$-bromo compound is then isolated by separating the two liquid phases, extracting the aqueous layer with a suitable solvent, such as hexane, and washing the combined organic solutions repeatedly with water in the proportions of 1 to 2 volumes of water per volume of organic solution. The organic solution is then dried with anhydrous magnesium sulfate or other suitable drying agent, filtered and evaporated under reduced pressure to give the crude 17,20;20,21-bismethylenedioxy derivative of $16\beta$-bromo-11-desoxyhydrocortisone (III). Purification is accomplished by recrystallization from a suitable organic solvent system, such as, methylene chloride-methanol or ether.

The $16\beta$-bromo-11-desoxyhydrocortisone-17,20;20,21-bismethylenedioxy derivative thus obtained is converted to the $16\beta$-fluorinated derivative by treatment with dry silver fluoride in anhydrous isopropyl alcohol for about 2 to 3 hours at reflux in an inert atmosphere. The $16\beta$-fluoro-bismethylenedioxy derivative is isolated by filtration of the insolubles followed by extraction with methylene chloride. Excess silver fluoride is extracted with water. The methylene chloride solution is dried and the crude $16\beta$-fluoro-11-desoxyhydrocortisone-17,20;20,21-bismethylenedioxy product (IV) recrystallized from dimethylformamide-water.

Reversal of the bismethylenedioxy function of the $16\beta$-fluoro derivative is accomplished by hydrolysis in acid media. It is preferred to use acetic or formic acid of concentrations from about 40 to 70%. In a preferred embodiment of this invention, the $16\beta$-fluoro-11-desoxyhydrocortisone-17,20;20,21-bismethylenedioxy compound is refluxed for a brief period, generally about 10–20 minutes, in 60% formic acid. The crude $16\beta$-fluoro corticosteroid (V) crystallizes upon the addition of water and concentration of the reaction mixture and is purified by recrystallization from a suitable organic solvent, such as, isopropyl ether.

Introduction of the $11\beta$-hydroxyl group into the steroid nucleus is accomplished by microbiological oxidation using a species of the genus Curvularia as set forth by Shull et al., in U.S. Patent 2,658,023. In the preferred embodiment of this invention $16\beta$-fluoro-11-desoxy-hydrocortisone is contacted with the oxygenating activity of an organism of the genus Curvularia in an aqueous nutrient medium to give $16\beta$-fluoro-hydrocortisone.

The thus produced $16\beta$-fluoro-hydrocortisone is acylated and dehydrogenated by means of excess selenium dioxide in a high boiling inert solvent, such as, phenetole, diethylene glycol diethylether, xylene, dioxane, and so forth. A tertiary organic base may be added to expedite reaction. In the preferred embodiment of this invention $16\beta$-fluoro-hydrocortisone, dibutyl cellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the $16\beta$-fluoro-prednisolone acetate isolated by crystallization from a suitable organic solvent or by chromatography on various adsorbents. It is then hydrolyzed to the $16\beta$-fluoro-prednisolone (VIII).

Alternatively, the $\Delta^4$-corticosteroid can be converted to the $\Delta^{1,4}$-corticosteroid by microbiological methods. In a specific embodiment of this technique, $16\beta$-fluoro-hydrocortisone is contacted in aqueous solution with the oxidizing activity of an organism of the genus Protaminobacter as described by Shull in U.S. Patent 2,776,927, to give the therapeutically active corticosteroid $16\beta$-fluoro-prednisolone.

Oxidation of $16\beta$-fluoro-hydrocortisone 21-acylate with, for example, chromium trioxide in acetic acid converts it to $16\beta$-fluoro-cortisone 21-acylate (VII). Hydrolysis of the said $16\beta$-fluoro-cortisone 21-acylate, preferably under acid conditions, produces the corresponding $16\beta$-fluorocortisone.

Chemical dehydrogenation of the thus-produced $16\beta$-fluoro-cortisone 21-acylate with selenium dioxide as described above, followed by hydrolysis, produces the corresponding $16\beta$-fluoro-prednisone (IX).

Alternatively, the appropriate 3,20-diketo-11-oxygenated-$16\beta$-bromo-$17\alpha$,21-dihydroxy corticosteroid can be converted to the corresponding 17,20;20,21-bismethylenedioxy 3,20-diketo-11-oxygenated-$16\beta$-fluoro-$17a$,21-dihydroxy derivative according to the process described herein. The 17,20;20,21-bismethylenedioxy 3,20-diketo-11-oxygenated-$16\beta$-fluoro-$17\alpha$,21-dihydroxy corticosteroid, can be subjected to the desired reactions after which the dihydroxyacetone is regenerated by acid hydrolysis.

The $16\beta$-fluoro-corticosteroids of this invention are especially valuable because of their high therapeutic activity as previously mentioned. In addition, they are valuable as intermediates for further synthesis. The therapeutically active intermediate, $16\beta$-fluoro-hydrocortisone, can, for example, be dehydrated to $16\beta$-fluoro-$\Delta^{4,9(11)}$-pregnadiene-$17\alpha$,21-diol-3,20-dione. The diverse reactions of this intermediate, and of the products derivable therefrom, will be appreciated by those skilled in the art, particularly in the light of our aforesaid copending and concurrently filed patent applications relating to $16\beta$-fluorinated corticosteroids.

The following examples are illustrative of the process and products of this invention. It should be remembered that these examples are given primarily by way of illustration and the invention in its broader aspects is not to be restricted to these examples.

EXAMPLE I

16β-bromo-11-desoxyhydrocortisone acetate (16β-bromo-Δ⁴-pregnene-17α,21-diol-3,20-dione-21-acetate)

To a solution of 16α,17α-oxido-desoxycorticosterone acetate (500 gms.) in glacial acetic acid (18 l.) was added 30% hydrobromic acid (800 ml.) in glacial acetic acid. After 15 minutes at 15° C. a large volume of water was added to precipitate the product 16β-bromo-11-desoxyhydrocortisone acetate. The product was not recrystallized because of its instability but was dried to constant weight in a vacuum desiccator at 40° C. A 76% yield was obtained, M.P.: 150° C. (dec.)

Analysis.—Calculated for $C_{23}H_{31}O_5Br$: 17.9% Br. Found: 17.3% Br.

In like manner, 16β-iodo- and 16β-chloro-11-desoxyhydrocortisone acetate are prepared from the respective hydrohalides.

EXAMPLE II

16β-bromo-11-desoxyhydrocortisone (16β-bromo-Δ⁴-pregnene-17α,21-diol-3,20-dione)

To a solution of 16β-bromo-11-desoxyhydrocortisone acetate (440 gms.) in chloroform (4.61 l.), methanol (15.15 l.), and water (1.7 l.) was added a solution of 1.7 l. of concentrated hydrochloric acid. After 16 hours at room temperature the reaction mixture was concentrated under reduced pressure at 30° C. to 35° C. with simultaneous addition of water. The product, 16β-bromo-11-desoxyhydrocortisone, was removed by filtration and used directly in the preparation of Example III. If desired, the product may be dried in a vacuum desiccator at 40° C. The dried product melts at 128° C. (dec.). A yield of 80% was obtained.

Analysis. — Calculated for $C_{21}H_{29}O_4Br$: 18.79%. Value: 19.18%. Found: 18.99%.

EXAMPLE III

17,20;21,21-bismethylenedioxy derivative of 16β-bromo-11-desoxyhydrocortisone (16β-bromo-Δ⁴-pregnene-17α,21-diol-3,20-dione-17,20;20,21-bismethylenedioxy derivative)

188 gms. of 16β-bromo-11-desoxyhydrocortisone, equivalent to 72.6 gms. of dried product, was dissolved in methylene chloride (835 ml.) and treated with 37% aqueous formaldehyde (720 ml.) and concentrated hydrochloric acid (720 ml.). The two phase system was stirred rapidly at room temperature for 16 hours. During this period most of the methylene chloride was distilled off and was replaced with hexane (4.6 l.). The product, the 17,20;20,21-bismethylenedioxy derivative of 16β-bromo-11-desoxyhydrocortisone was isolated by separating the two liquid phases, extracting the aqueous phase with one half its volume of hexane and washing the combined hexane solutions with four separate portions of water in the proportions of ¼ volume of water per volume of hexane solution. The hexane solution was then dried with anhydrous magesium sulfate, filtered and evaporated under reduced pressure to give the crude product in 60% yield. Upon recrystallization from methylene chloride-methanol the product melted at 223° C. (dec.).

Analysis.—Calculated for $C_{23}H_{31}O_5Br$: 59.10% carbon, 6.69% hydrogen. Found: 59.23% carbon, 6.70% hydrogen.

Repetition of the above procedure using the 16β-bromo derivatives of hydrocortisone, cortisone, prednisolone and prednisone gives the corresponding 17,20;20,21-bismethylenedioxy derivatives.

EXAMPLE IV

17,20;20,21-bismethylenedioxy derivative of 16β-fluoro-11-desoxyhydrocortisone (16β-fluoro-Δ⁴-pregnene-17α,21-diol-3,20-dione-17,20;20,21-bismethylenedioxy derivative)

30 gms. of dried silver fluoride was added in portions to 10 gms. of 16β-bromo-11-desoxyhydrocortisone-17,20;20,21-bismethylenedioxy derivative in 500 ml. of anhydrous isopropyl alcohol at reflux under an atmosphere of nitrogen. The isopropyl alcohol was dried by distillation from aluminum isopropoxide. After two hours at reflux, the insoluble matter was filtered and the product extracted with methylene chloride. Excess silver fluoride was removed by water extraction. The dry solution was then concentrated and the residue recrystallized from dimethylformamide-water. A 70% yield of the 17,20;20,21-bismethylenedioxy derivative of 16β-fluoro-11-desoxyhydrocortisone was obtained: M.P.: 230–8° to 231–2°.

Analysis.—Calculated for $C_{23}H_{31}O_5F$: 67.96% carbon, 7.69% hydrogen, 4.67% fluorine. Found: 67.84% carbon, 7.72% hydrogen, 4.79% fluorine.

In like manner, the following 17,20;20,21-bismethylenedioxy compounds are prepared from the appropriate 16β-bromo compound:

17,20;20,21-bismethylenedioxy-16β-fluoro-hydrocortisone
17,20;20,21-bismethylenedioxy-16β-fluoro-cortisone
17,20;20,21-bismethylenedioxy-16β-fluoro-prednisone
17,20;20,21-bismethylenedioxy-16β-fluoro-prednisolone

EXAMPLE V

16β-fluoro-11-desoxyhydrocortisone (16β-fluoro-Δ⁴-pregnene-17α,21-diol-3,20-dione)

Thirty gms. of the 16β-fluoro-11-desoxyhydrocortisone-17,20;20,21-bismethylenedioxy derivative was refluxed for 23 minutes in 60% formic acid (1.67 l.). The solution was then cooled to 30° C. immediately by the addition of ice and then extracted several times with methylene chloride. The combined organic layers were extracted twice with water, dried over anhydrous magnesium sulfate, filtered and concentrated to a heavy oil under reduced pressure.

The oil was treated with 200 ml. methanol containing 0.8 g. concentrated sulfuric acid at room temperature for one hour to hydrolyze the small amounts of 21-formate ester formed during the above processing. The resulting mixture was treated with 500 ml. water and extracted with several portions of methylene chloride. The combined organic layers were washed with several portions of water, dried over anhydrous magnesium sulfate, filtered and concentrated under vacuo. The last traces of methanol were displaced by adding and distilling off several small portions of benzene. The product was dissolved in a minimum amount of refluxing benzene, filtered hot to remove haze, concentrated to first sign of crystallization at atmospheric pressure and cooled to 10° C. to complete the crystallization. A 58% yield was obtained; M.P. 179.1–180.8° C. (dec.)

Analysis. — Calculated for $C_{21}H_{24}O_4F$: 69.20% C, 8.02% H, 5.21% F. Found: 69.05% C, 8.06% H, 5.02% F.

Similarly, hydrolysis of the products of Example IV produces the following products:

16β-fluoro-hydrocortisone
16β-fluoro-cortisone
16β-fluoro-prednisone
16β-fluoro-prednisolone

EXAMPLE VI

16β-fluoro-hydrocortisone (16β-fluoro-$\Delta^4$-pregnene-11β,17α,21-triol-3,20-dione)

11β-hydroxylation of the thus produced 16β-fluoro-11-desoxyhydrocortisone (2 g.) in accordance with U.S. Patent 2,658,023 gave 16β-fluoro-hydrocortisone.

Acetylation according to conventional methods gave the corresponding 16β-fluoro-hydrocortisone acetate.

EXAMPLE VII

16β-fluoro-prednisolone acetate (16β-fluoro-$\Delta^{1,4}$-pregnadiene-11β,17α,21-triol-3,20-dione-21-acetate)

A. *Selenium dioxide dehydrogenation.*—A mixture of 0.5 g. of 16β-fluoro-hydrocortisone acetate, freshly sublimed selenium dioxide (0.5 g.) and 10 ml. of dibutyl Cellosolve was heated under a nitrogen atmosphere for about 10 hours at 175° C. The brown supernatant solution was decanted from the residual solid and cooled to room temperature. The addition of low boiling petroleum ether precipitated impure 16β-fluoro-prednisolone acetate. Chromatographic separation on a Florisil (synthetic magnesium silicate) column gave, on elution with methylene chloride-ethanol, the pure product.

Repetition of this procedure with the 17,20;20,21-bismethylenedioxy derivatives of 16β-fluoro-hydrocortisone and 16β-fluoro-cortisone produces the 17,20;20,21-bismethylenedioxy derivatives of 16β-fluoro-prednisolone and 16β-fluoro-prednisone.

B. *Microbiological procedure.* — 16β-fluoro-hydrocortisone was subjected to submerged, aerated fermentation with a living culture of *Protaminobacter alboflavum* in accordance with U.S. Patent 2,776,927 to give 16β-fluoro-prednisolone.

EXAMPLE VIII

16β-fluoro-prednisolone (16β-fluoro-$\Delta^{1,4}$-pregnadiene-11β,17α,21-triol-3,20-dione)

Acid hydrolysis of 16β-fluoro-prednisolone acetate, the product of Example VII, A, according to the procedure of Example II gave 16β-fluoro-prednisolone identical to the product of Example VII, B.

EXAMPLE IX

16β-fluoro-cortisone (16β-fluoro-$\Delta^4$-pregnene-17α,21-diol-3,11,20-trione)

16β-fluoro-hydrocortisone 21-acetate (0.5 g.) is oxidized in glacial acetic acid (12 ml.) with chromium trioxide (0.2 g.) in 50% aqueous acetic acid at about 12° C. to 15° C. for approximately 30 minutes. The mixture is then poured into water (100 ml.), neutralized with sodium bicarbonate to give 16α-fluoro-cortisone 21-acetate. Hydrolysis of the 21-acetate according to the procedure of Example II gives 16β-fluoro-cortisone.

EXAMPLE X

16β-fluoro-prednisone (16β-fluoro-$\Delta^{1,4}$-pregnadiene-17α,21-diol-3,11,20-trione)

Following the procedure of Example VII, A, 16β-fluoro-cortisone 21-acetate is dehydrogenated to 16β-fluoro-prednisone 21-acetate. Hydrolysis of the said 21-acetate in accordance with Example II produces 16β-fluoro-prednisone.

The product thus obtained is identical to the product produced by oxidation of 16β-fluoro-prednisolone according to the procedure of Example X.

EXAMPLE XI

A variety of 21-esters of 16β-fluoro-prednisolone, 16β-fluoro-hydrocortisone, 16β-fluoro-cortisone and of 16β-fluoro-prednisone are prepared using acyl chlorides or acyl anhydrides as acylating agents in accordance with conventional methods. These include such esters as the formate, the acetate, the propionate, the isobutyrate, the hexanoate, the octanoate, the benzoate and the succinate.

What is claimed is:

1. 17,20;20,21-bismethylenedioxy - 16β - fluoro-11-desoxyhydrocortisone.
2. 17,20;20,21-bismethylenedioxy - 16β - fluoro-prednisolone.
3. 17,20;20,21 - bismethylenedioxy - 16β - fluoro-cortisone.
4. 17,20;20,21-bismethylenedioxy - 16β - fluoro-prednisone.

References Cited in the file of this patent

UNITED STATES PATENTS

| | | |
|---|---|---|
| 2,781,366 | Schneider | Feb. 12, 1957 |
| 2,831,872 | Fried et al. | Apr. 22, 1958 |
| 2,940,968 | Sletzinger et al. | June 14, 1960 |

OTHER REFERENCES

Beyler et al.: "Journal of American Chem. Soc." (1958), vol. 80, pp. 1517–18 relied on.

UNITED STATES PATENT OFFICE
CERTIFICATE OF CORRECTION

Patent No. 3,022,297            February 20, 1962

Rudolph G. Berg et al.

It is hereby certified that error appears in the above numbered patent requiring correction and that the said Letters Patent should read as corrected below.

Column 3, line 33, for "17,29" read -- 17,20 --; column 5, line 45, for "17,20;21,21-" read -- 17,20;20,21- --; column 6, lines 21 and 22, for "230-8° to 231-2°" read -- 230.8° to 231.2° --; column 8, line 4, for "16α-" read -- 16β- --; line 21, for "Example X." read -- Example IX. --.

Signed and sealed this 26th day of June 1962.

(SEAL)
Attest:

ERNEST W. SWIDER            DAVID L. LADD
Attesting Officer            Commissioner of Patents